(12) United States Patent
Bosworth et al.

(10) Patent No.: US 9,188,190 B2
(45) Date of Patent: Nov. 17, 2015

(54) TEMPERATURE ADAPTIVE FLUID DAMPING SYSTEM

(75) Inventors: Jeffrey Bosworth, Dallas, TX (US); Frank B. Stamps, Colleyville, TX (US)

(73) Assignee: Textron Innovations Inc., Providence, RI (US)

(*) Notice: Subject to any disclaimer, the term of this patent is extended or adjusted under 35 U.S.C. 154(b) by 167 days.

(21) Appl. No.: 13/697,029

(22) PCT Filed: Feb. 24, 2011

(86) PCT No.: PCT/US2011/025983
§ 371 (c)(1), (2), (4) Date: Nov. 9, 2012

(87) PCT Pub. No.: WO2012/115645
PCT Pub. Date: Aug. 30, 2012

(65) Prior Publication Data
US 2013/0048127 A1 Feb. 28, 2013

(51) Int. Cl.
F16F 9/52 (2006.01)
F16F 13/08 (2006.01)
F16F 9/34 (2006.01)
B64C 27/35 (2006.01)
B64C 27/51 (2006.01)

(52) U.S. Cl.
CPC .............. F16F 13/08 (2013.01); F16F 9/3415 (2013.01); F16F 9/52 (2013.01); B64C 27/35 (2013.01); B64C 27/51 (2013.01); *F16F 2222/02* (2013.01)

(58) Field of Classification Search
CPC ....... B60T 8/4031; B60T 8/368; B64C 27/51; B64C 27/35; B64C 27/001; B64C 27/32; B64C 27/33; F16F 2222/00; F16F 1/00; F16F 2224/00; B60G 1/00; B60G 2200/00; B60G 2202/00

USPC ........... 188/276, 277, 313, 316, 317, 322.13, 188/322.15, 322.16, 322.18; 267/64.28, 267/136, 140.11, 140.2, 140.4, 141, 141.2; 244/54
See application file for complete search history.

(56) References Cited

U.S. PATENT DOCUMENTS 2,603,435 A 7/1952 Metzler
2,774,553 A 12/1956 Jensen
(Continued)

FOREIGN PATENT DOCUMENTS

EP 1445373 A 8/1976
EP 1000274 A1 5/2000
(Continued)

OTHER PUBLICATIONS

Office Action dated Aug. 8, 2014 from counterpart CA App. No. 2,828,087.
(Continued)

*Primary Examiner* — Pamela Rodriguez
(74) *Attorney, Agent, or Firm* — James E. Walton

(57) ABSTRACT

A temperature adaptive fluid damping system is provided. One embodiment of the temperature adaptive fluid damping system comprises two fluid chambers, a piston in fluid communication with the fluid chambers, and a fluid path between the fluid chambers. An elastomeric retaining element adjacent to the fluid path is constrained to deform substantially perpendicular to the fluid path, so that the retaining element is operable to vary the cross-sectional area of the fluid path inversely to a change in temperature.

13 Claims, 7 Drawing Sheets

(56) References Cited

U.S. PATENT DOCUMENTS

| | | | |
|---|---|---|---|
| 3,207,457 A | 9/1965 | Kisovec | |
| 3,303,887 A | 2/1967 | Pfleiderer | |
| 4,273,303 A | 6/1981 | Somm | |
| 4,811,919 A | 3/1989 | Jones | |
| 4,947,700 A | 8/1990 | Kern et al. | |
| 5,004,215 A | 4/1991 | Aubry | |
| 5,374,039 A | 12/1994 | Schmidt et al. | |
| 5,439,082 A | 8/1995 | McKeown et al. | |
| 5,501,434 A | 3/1996 | McGuire | |
| 5,535,861 A | 7/1996 | Young | |
| 5,662,046 A | 9/1997 | Wright et al. | |
| 5,743,362 A | 4/1998 | Clinard | |
| 5,775,677 A | 7/1998 | Englund | |
| 5,788,372 A | 8/1998 | Jones et al. | |
| 6,092,795 A * | 7/2000 | McGuire | 267/140.11 |
| 6,224,019 B1 | 5/2001 | Peterson et al. | |
| 6,644,445 B2 | 11/2003 | Dodge | |
| 6,668,986 B2 | 12/2003 | Moradmand et al. | |
| 2006/0162778 A1 | 7/2006 | Nichols et al. | |
| 2007/0137956 A1 | 6/2007 | Stamps | |
| 2008/0079222 A1 | 4/2008 | Namuduri | |

FOREIGN PATENT DOCUMENTS

| | | |
|---|---|---|
| EP | 2353726 A1 | 8/2011 |
| JP | 404069423 A | 3/1992 |

OTHER PUBLICATIONS

Office Action dated Aug. 5, 2014 from counterpart CN App. No. 2011800679036.
International Search Report and the Written Opinion of the International Searching Authority mailed by ISA/USA, U.S. Patent and Trademark Office on Apr. 19, 2011 for International Patent Application No. PCT/US11/25983, 10 pages.
Office Action from U.S. Patent and Trademark Office on Sep. 19, 2008 for related U.S. Appl. No. 10/568,170, 7 pages.
Office Action from U.S. Patent and Trademark Office on May 27, 2009 for related U.S. Appl. No. 10/568,170, 7 pages.
Final Office Action from U.S. Patent and Trademark Office on Dec. 15, 2009 for related U.S. Appl. No. 10/568,170, 9 pages.
Advisory Action from U.S. Patent and Trademark Office on Feb. 19, 2010 for related U.S. Appl. No. 10/568,170, 2 pages.
Office Action from U.S. Patent and Trademark Office on Mar. 25, 2010 for related U.S. Appl. No. 10/568,170, 8 pages.
Final Office Action from U.S. Patent and Trademark Office on Sep. 9, 2010 for related U.S. Appl. No. 10/568,170, 13 pages.
Advisory Action from U.S. Patent and Trademark Office on Nov. 3, 2010 for related U.S. Appl. No. 10/568,170, 3 pages.
Office Action from U.S. Patent and Trademark Office on Dec. 9, 2010 for related U.S. Appl. No. 10/568,170, 12 pages.
Final Office Action from U.S. Patent and Trademark Office on May 6, 2011 for related U.S. Appl. No. 10/568,170, 12 pages.
Advisory Action from U.S. Patent and Trademark Office on Jul. 18, 2011 for related U.S. Appl. No. 10/568,170, 3 pages.
Office Action from U.S. Patent and Trademark Office on Aug. 4, 2011 for related U.S. Appl. No. 10/568,170, 14 pages.
English Translation of Notification of Reexamination in CN counterpart Application No. 2004800247051, issued by Patent Office of China, Mar. 18, 2010.
Proposed Amendments and Remarks sent to foreign associate, on Apr. 19, 2010, in response to Notification of Reexamination in CN counterpart Application No. 2004800247051, issued by Patent Office of China, Mar. 18, 2010.
Notification of Reexamination dated Jul. 2, 2010 from counterpart CN Application No. 2004800247051.
Response to Reexamination dated Jul. 2, 2007 from counterpart CN Application No. 2004800247051, dated Jul. 29, 2010.
Notification of Reexamination in the counterpart CN Application No. 2004800247051, issued by the Patent Office of China on Oct. 21, 2010.
Notice of Allowance from the Canadian Intellectual Property Office for corresponding CA Application No. 2,533,201, dated Mar. 3, 2010.
Office Action from the Canadian Intellectual Property Office for corresponding CA Application No. 2,533,201, dated Jan. 19, 2009.
International Search Report of the International Searching Authority mailed by ISA/USA, U.S. Patent and Trademark Office on Mar. 7, 2005 for International Patent Application No. PCT/US04/27964, 7 pages.
International Preliminary Report on Patentability of the International Searching Authority mailed by ISA/USA, U.S. Patent and Trademark Office on Mar. 9, 2006 for International Patent Application No. PCT/US04/27964, 5 pages.
Office Action from related European patent application No. 11859458, mailed Mar. 13, 2014, 7 pages.
Search report in related European patent application No. 11859458, mailed Feb. 25, 2014, 3 pages.
Second Office Action dated Mar. 10, 2015 from counterpart CN App. No. 2011800679036.
Office Action dated May 29, 2015 from counterpart CA App. No. 2,828,087.
Third Office Action dated Sep. 11, 2015 from counterpart CN App. No. 201180067903.6.

* cited by examiner

TEMPERATURE ADAPTIVE FLUID DAMPING SYSTEM

TECHNICAL FIELD

This disclosure relates in general to the field of damping oscillatory motion, and more particularly to a temperature adaptive fluid damping system.

DESCRIPTION OF THE PRIOR ART

Damping systems are frequently used to prevent excessive motion in mechanical systems. One such damping system is a dashpot (or fluid damper), which generally comprises a piston and a fluid-filled cylinder. Fluid in the cylinder resists relative motion between the piston and cylinder, as it moves around the piston or through an orifice in the piston. This type of damper absorbs mechanical energy and dissipates it as heat energy. Another common damping system relies on elastomeric elements, which dissipate energy through shear deformation. Fluid dampers generally have higher damping than elastomeric dampers, but are more temperature sensitive. Thus, the design of a damping system having sufficient damping without being adversely affected by temperature variations has presented significant challenges to engineers and manufacturers of mechanical systems, particularly in the aerospace and automotive industries where systems are often subjected to extreme temperature variations.

BRIEF DESCRIPTION OF THE DRAWINGS

The features believed characteristic and novel of the temperature adaptive fluid damping system are set forth in the appended claims. However, the system, as well as a preferred mode of use, and further objectives and advantages thereof, will best be understood by reference to the following detailed description when read in conjunction with the accompanying drawings, wherein:

While the system is susceptible to various modifications and alternative forms, the novel features thereof are shown and described below through specific example embodiments. It should be understood, however, that the description herein of specific example embodiments is not intended to limit the system or apparatus to the particular forms disclosed, but on the contrary, the intention is to cover all modifications, equivalents, and alternatives falling within the spirit and scope of the appended claims.

DESCRIPTION OF THE PREFERRED EMBODIMENT

Illustrative embodiments of the novel system are described below. In the interest of clarity, not all features of such embodiments may be described. It should be appreciated that in the development of any such system, numerous implementation-specific decisions must be made to achieve specific goals, such as compliance with system-related and business-related constraints, which will vary from one implementation to another. Moreover, it should be appreciated that such decisions might be complex and time-consuming, but would nevertheless be a routine undertaking for those of ordinary skill in the art having the benefit of this disclosure.

Reference may be made to the spatial relationships between various components and to the spatial orientation of various aspects of components as the system is depicted in the attached drawings. However, as should be recognized by those skilled in the art, the elements, members, components, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the example embodiments described herein may be oriented in any desired direction.

Figure 1:
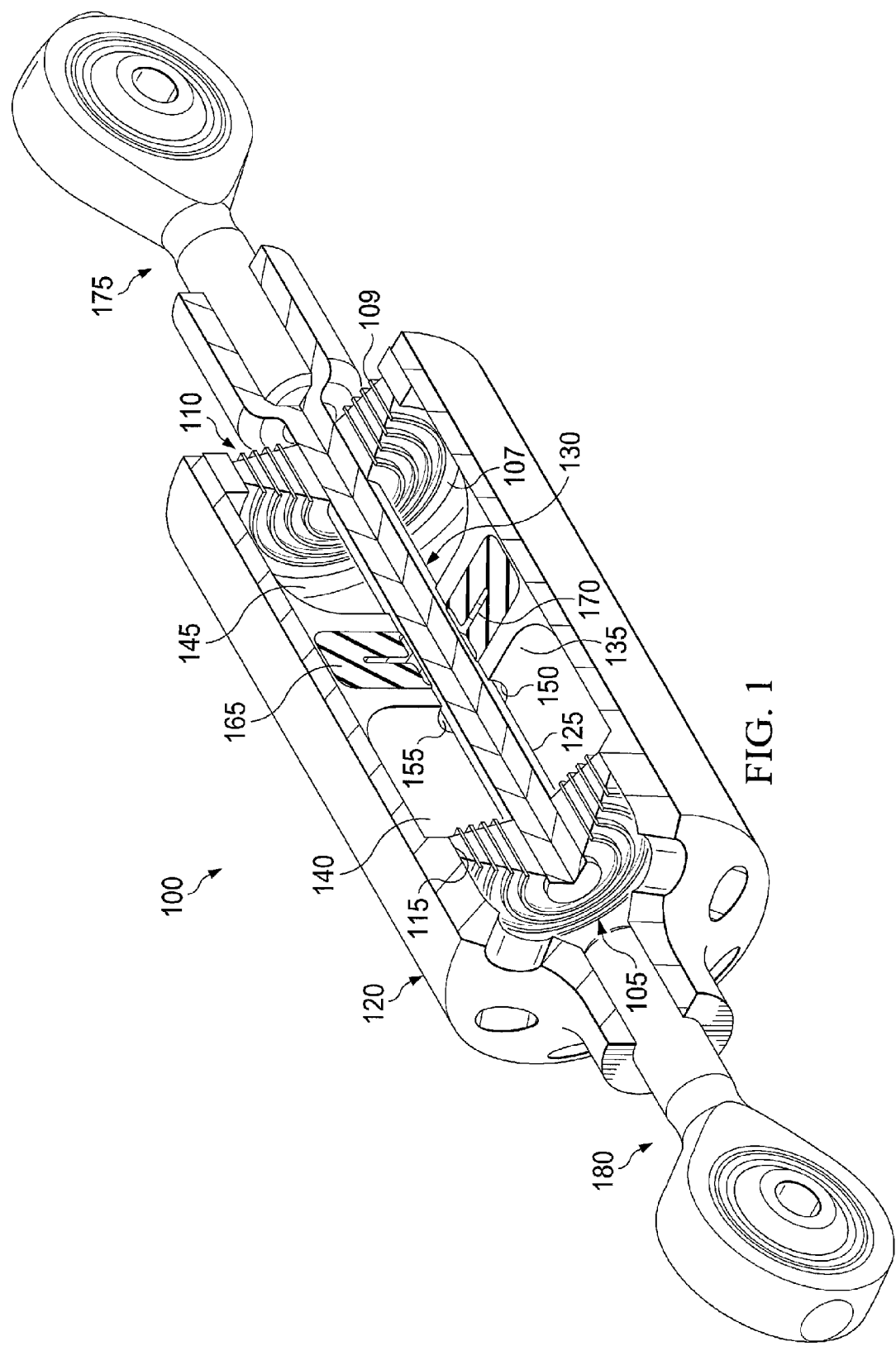
FIG. 1 is an isometric cutaway view of one embodiment of a thermally adaptive fluid damper according to this specification.

FIG. 1 is an isometric cutaway view of one embodiment of a thermally adaptive fluid damper 100 according to this specification. Elastomeric seals 105 and 110 are sealingly attached to an inner surface 115 of a housing 120, and sealingly attached to an outer surface 125 of a piston 130. Elastomeric seals 105 and 110 are preferably high-capacity laminate seals, with alternating layers of an elastomeric material 107 and a rigid, non-elastomeric material, such as a metal 109. An inner wall 135 within housing 120 separates elastomeric seals 105 and 110, and forms fluid chambers 140 and 145. Piston 130 passes through a bore 150 in inner wall 135. The cross-sectional area of piston 130 is smaller than the cross-sectional area of bore 150, thereby creating an orifice 155 that separates piston 130 from an inner surface of bore 150 and provides a fluid path between fluid chamber 140 and fluid chamber 145 along piston 130. Inner wall 135 includes a retaining element 165 and a valve element 170. Retaining element 165 is generally an elestomeric element, secured and constrained by the interior surfaces of inner wall 135. Valve element 170 is generally a non-elastomeric solid, such as a metal, secured by the compressive forces of retaining element 165. Valve element 170 may be segmented to provide additional fluid paths between fluid chambers 140 and 145. A first fastener assembly 175 is rigidly connected to one end of piston 130, and a second fastener assembly 180 is rigidly connected to housing 120. First fastener assembly 175 and second fastener assembly 180 may be used to connect damper 100 to a moving element.

Figure 2:
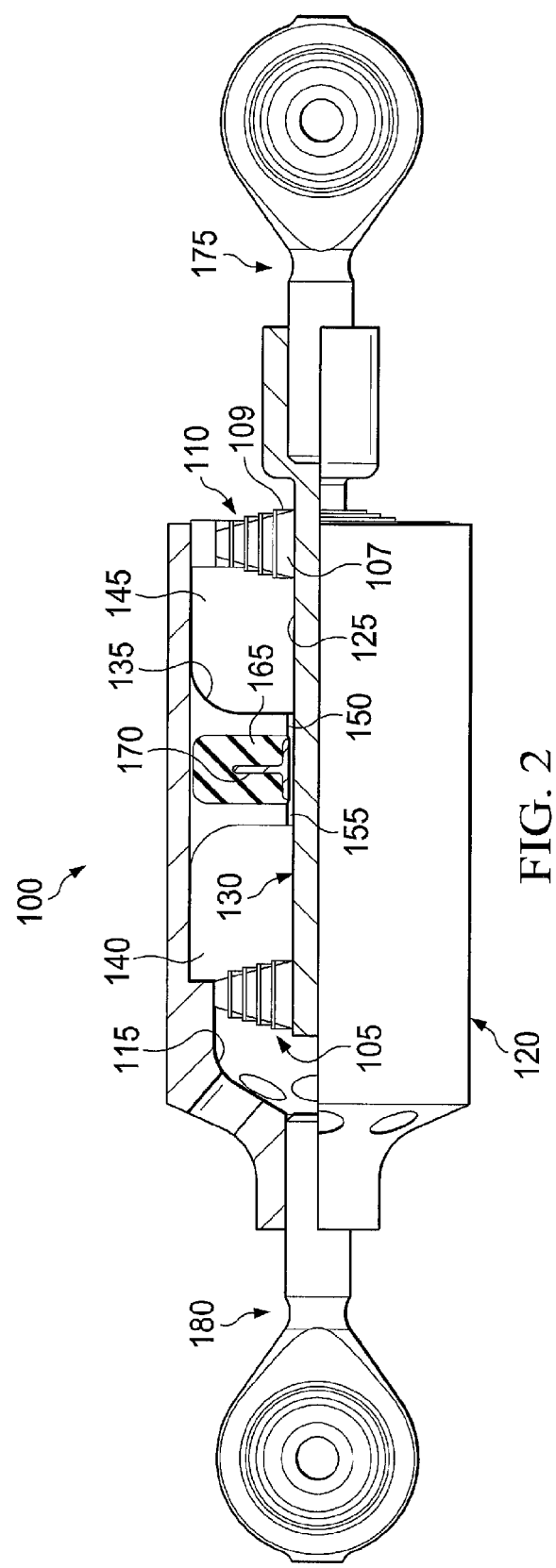
FIG. 2 is a cutaway view of the damper of FIG. 1.

FIG. 2 is a cutaway view of fluid damper 100. Elastomeric seals 105 and 110 are sealingly attached to inner surface 115 of housing 120, and sealingly attached to outer surface 125 of piston 130. In damper 100, elastomeric seals 105 and 110 generally comprise alternating layers of elastomeric material 107 and metal 109. Inner wall 135 within housing 120 separates elastomeric seals 105 and 110, and forms fluid chambers 140 and 145. Piston 130 passes through bore 150 in inner wall 135. Orifice 155 separates piston 130 from an inner surface of bore 150. Inner wall 135 includes retaining element 165 and valve element 170. Retaining element 165 is generally an elestomeric element, while valve element 170 is a non-elastomeric solid, such as a metal. Valve element 170 may be segmented. First fastener assembly 175 is rigidly connected to one end of piston 130, and second fastener assembly 180 is rigidly connected to housing 120.

In operation, each fluid chamber 140 and 145 contains an incompressible fluid, such as hydraulic fluid or oil. In response to external forces on fastener assembly 175 or 180, piston 130 is displaced along its lengthwise axis relative to housing 120. Displacement of piston 130 causes deformation in elastomeric seals 105 and 110, which changes the volumes of fluid chambers 140 and 145 and the pressures of the fluid. Consequently, the fluid may flow between chambers 140 and 145 through orifice 155. Damper 100 may also include a washer or other paddle element connected to piston 130 to facilitate or enhance flow. The fluid flow between fluid chambers 140 and 145 resists displacement of piston 130 and provides a desired damping force on piston 130. The shear force of elastomeric seals 105 and 110 provide a desired spring rate, k, for fluid damper 100.

Elastomeric materials are generally sensitive to changes in temperature. Thus, retaining element 165 is a temperature-sensitive element that expands with increased temperature and contracts with decreased temperature. Because retaining element 165 is constrained by inner wall 135 in all but one direction, changes in temperature cause retaining element 165 to deform only in that direction. In the embodiment of damper 100, retaining element 165 is constrained to deform substantially perpendicular to the fluid path provided by orifice 155. As retaining element 165 expands and contracts, valve element 170 is also displaced accordingly, adjacent to piston 130, thereby expanding and contracting orifice 155 to vary the cross-sectional area of the fluid path provided by orifice 155. Consequently, as temperature decreases, orifice 155 is expanded, allowing more fluid to flow between chambers 140 and 145. Likewise, as temperature increases, orifice 155 is contracted, restricting fluid flow between chambers 140 and 145.

Figure 3:
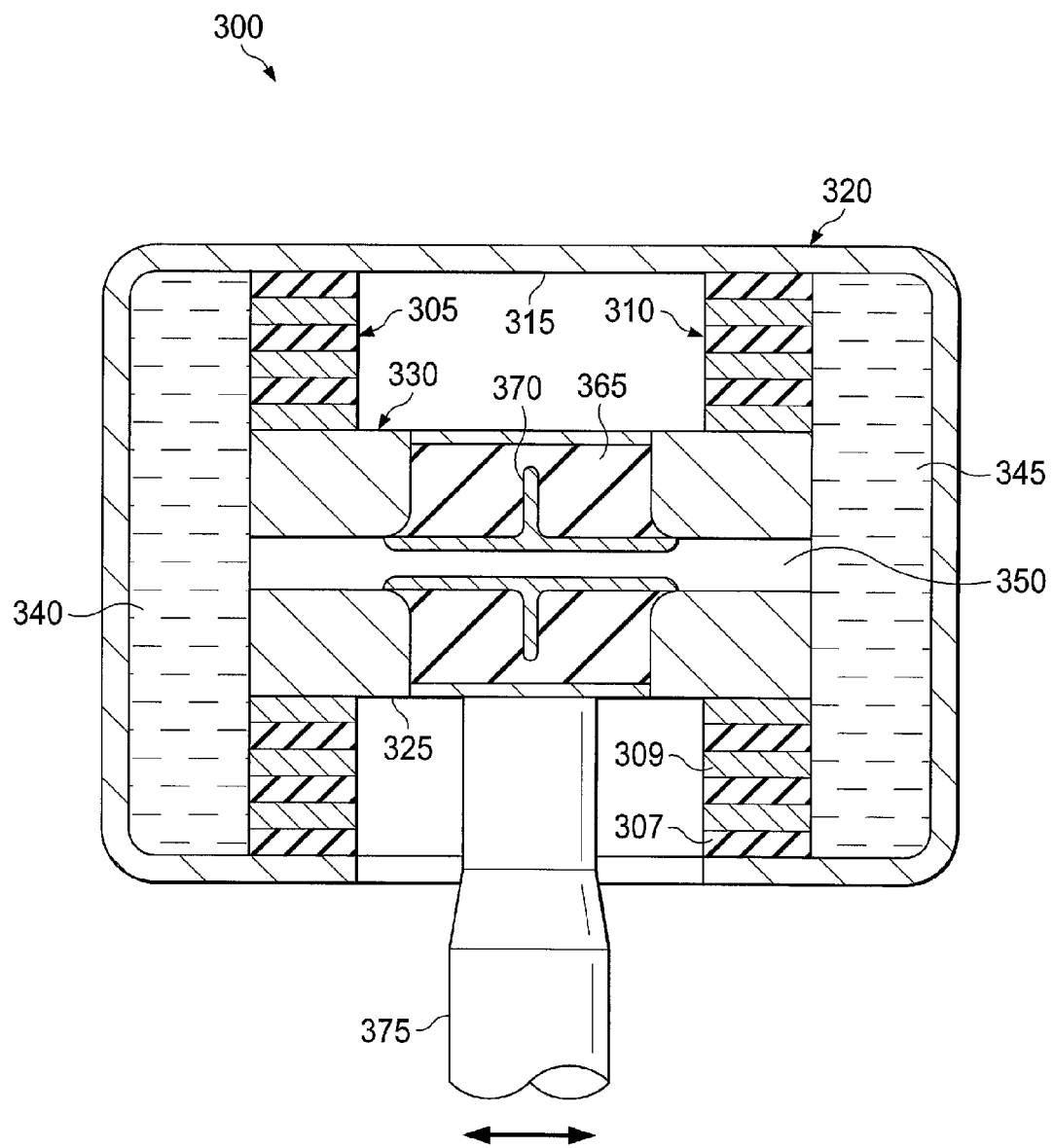
FIG. 3 is a cross-sectional plan view of an alternative embodiment of a thermally adaptive fluid damper according to this specification.

FIG. 3 is a cross-sectional plan view of an alternative embodiment of a thermally adaptive fluid damper 300 according to this specification. Elastomeric seals 305 and 310 are sealingly attached to an inner surface 315 of a housing 320, and sealingly attached to an outer surface 325 of a piston 330. Elastomeric seals 305 and 310 are preferably high-capacity laminate seals, with alternating layers of an elastomeric material 307 and a rigid, non-elastomeric material, such as a metal 309. Elastomeric seals 305 and 310 form fluid chambers 340 and 345 in housing 320. Piston 330 includes a bore 350, a retaining element 365, and a valve element 370. Bore 350 provides a fluid path between fluid chamber 340 and fluid chamber 345. Retaining element 365 is generally an elastomeric element, embedded in piston 330 and constrained by interior surfaces of piston 330. Valve element 370 is preferably a non-elastomeric solid, such as a metal, embedded in retaining element 365 so that it is secured in place by compressive forces of retaining element 365. Valve element 370 may be segmented to provide additional fluid paths between fluid chambers 340 and 345. A post assembly 375 may be rigidly connected to piston 330 for connecting damper 300 to a moving element.

In operation, each fluid chamber 340 and 345 contains an incompressible fluid, such as hydraulic fluid or oil. In response to external forces on post assembly 375, piston 330 is displaced along its lengthwise axis relative to housing 320. Displacement of piston 330 causes deformation in elastomeric seals 305 and 310, which changes the volumes of fluid chambers 340 and 345 and the pressures of the fluid. Consequently, the fluid may flow between chambers 340 and 345 through bore 350, resisting displacement of piston 330 and providing a desired damping force on piston 330. The shear force of elastomeric seals 305 and 310 provide a desired spring rate, k, for fluid damper 300.

Retaining element 365 is a temperature-sensitive element that expands with increased temperature and contracts with decreased temperature. Because retaining element 365 is constrained by piston 330 in all but one direction, changes in temperature cause retaining element 365 to deform only in that direction. In the embodiment of fluid damper 300, this deformation is constrained substantially perpendicular to the fluid path provided by bore 350. As retaining element 365 expands and contracts, valve element 370 is also displaced accordingly, adjacent to piston 330, thereby varying the cross-sectional area of the fluid path provided by bore 350. Consequently, as temperature decreases, the effective diameter of bore 350 is expanded, allowing more fluid to flow between chambers 340 and 345. Likewise, as temperature increases, the effective diameter of bore 350 is contracted, restricting fluid flow between chambers 340 and 345.

Figure 4:
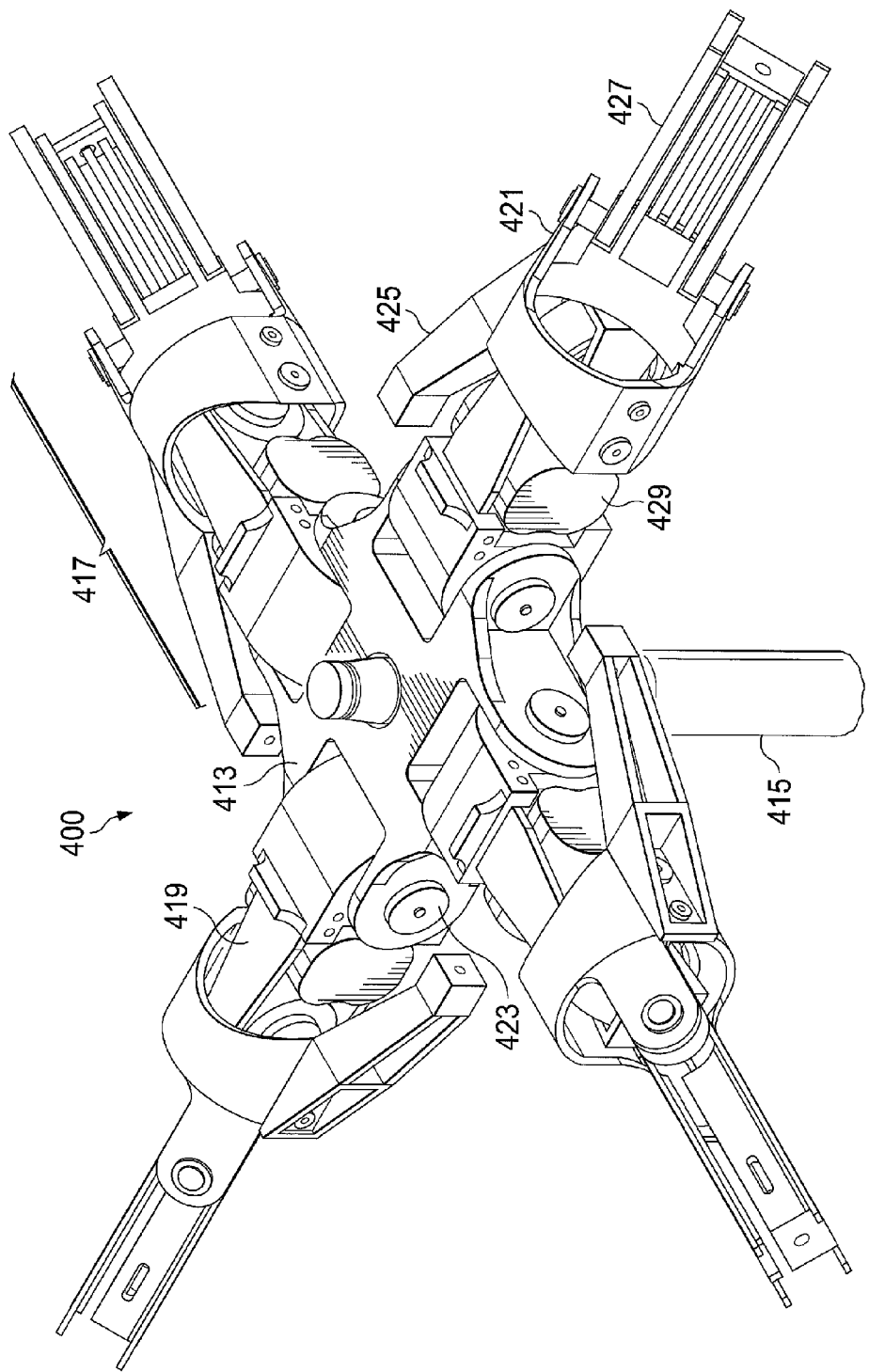
FIG. 4 is an isometric view of a four-blade embodiment of a rotor hub according to this specification.

FIG. 4 is an isometric view of a rotor hub 400 according to this specification. As shown, hub 400 is configured as a four-blade hub for use as a proprotor hub of a tiltrotor aircraft. Rotor hubs may have more or fewer blades and may also be configured for use on other rotary-wing aircraft, including helicopters.

Hub 400 has a central member 413 which is adapted to fixedly receive a mast 415. Mast 415 is rotated by torque from a drive unit, which may be routed through a transmission (not shown), and the torque is transferred through mast 415 to central member 413 for rotating hub 400. Blades (not shown) are attached to hub 400 with blade attachment assemblies 417, each assembly 417 comprising a blade attachment strap 419 and a blade grip 421. Straps 419 are circumferential and oriented vertically to extend out of the plane of rotation. Straps 419 are hingedly connected to central member 413 at flapping hinges 423, and blade grips 421 are rotatably and pivotally attached to the outer end of straps 419. Flapping hinges 423 allow for out-of-plane flapping motion of each blade about an axis generally parallel to the plane of rotation of hub 400. Blade grips 421 rotate relative to straps 419 about radial pitch axes that are generally parallel to the plane of rotation of hub 400, and a pitch horn 425 extends from the leading edge of each grip 421 for controlling the pitch of the associated blade. Pitch horns 425 combine with the associated flapping hinge 423 to yield the desired delta-3 pitch-flap coupling. In addition, each blade grip 421 is connected to strap 419 with a lead/lag bearing (not shown), and the grip 421 pivots relative to the associated strap 419 about a lead/lag axis generally normal to the plane of rotation of hub 400. This provides for chordwise, lead and lag motion of the blades in the plane of rotation of hub 400 about the lead/lag axis. Both the bearing for flapping hinge 423 and the lead/lag bearing are located within strap 419. The flapping hinge axis is located inboard, and the lead/lag axis is located outboard, the axes being non-coincident. Blade roots 427 are shown installed within the outer ends of grips 421. To control the chordwise motion of blades about the lead/lag axis, a damper 429 according to this specification is installed in each strap 419 and is operably connected to the associated blade grip 421.

Figure 5:
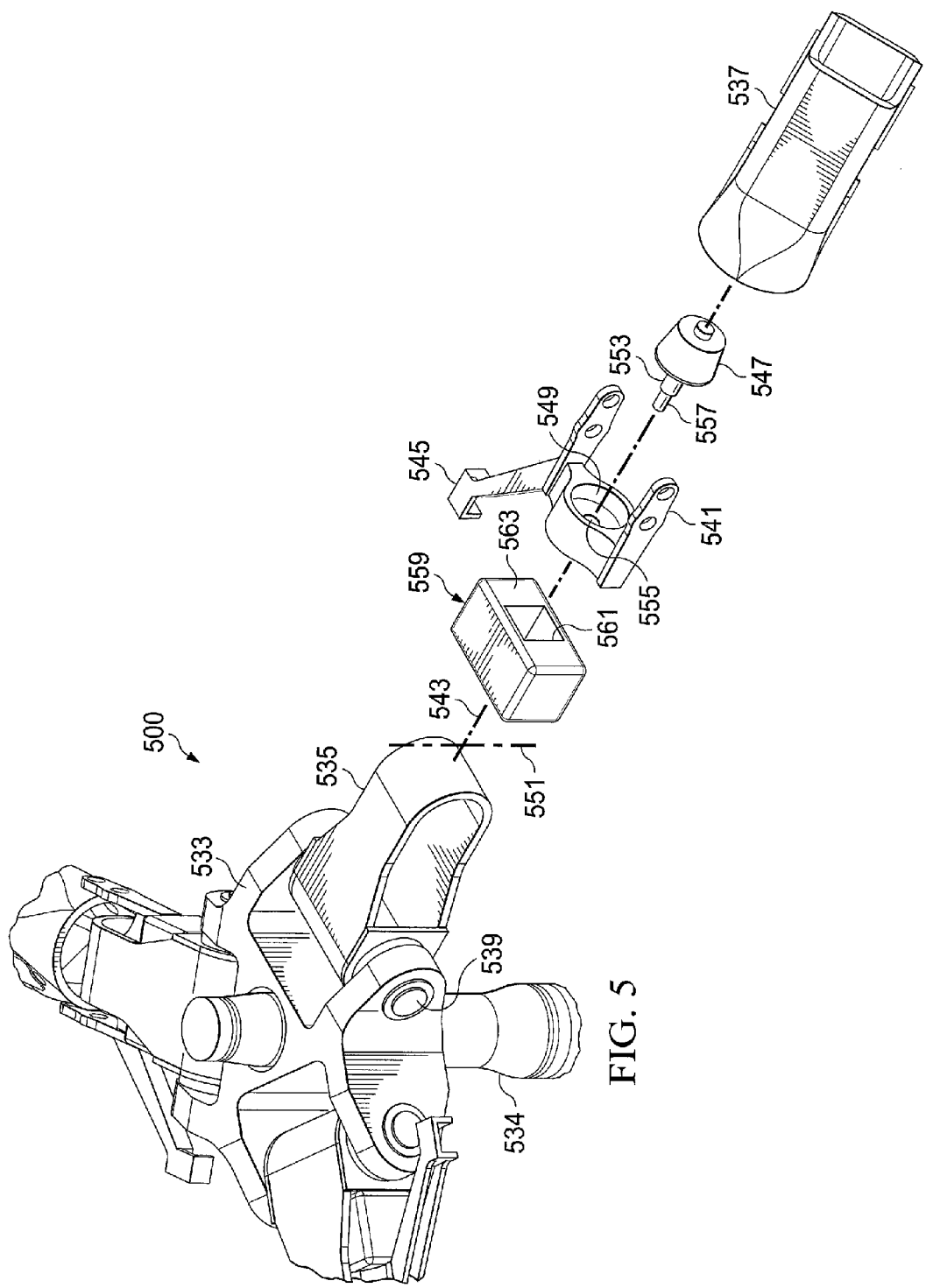
FIG. 5 is an exploded partial view of a three-blade embodiment of a rotor hub according to this specification.
Figure 6:
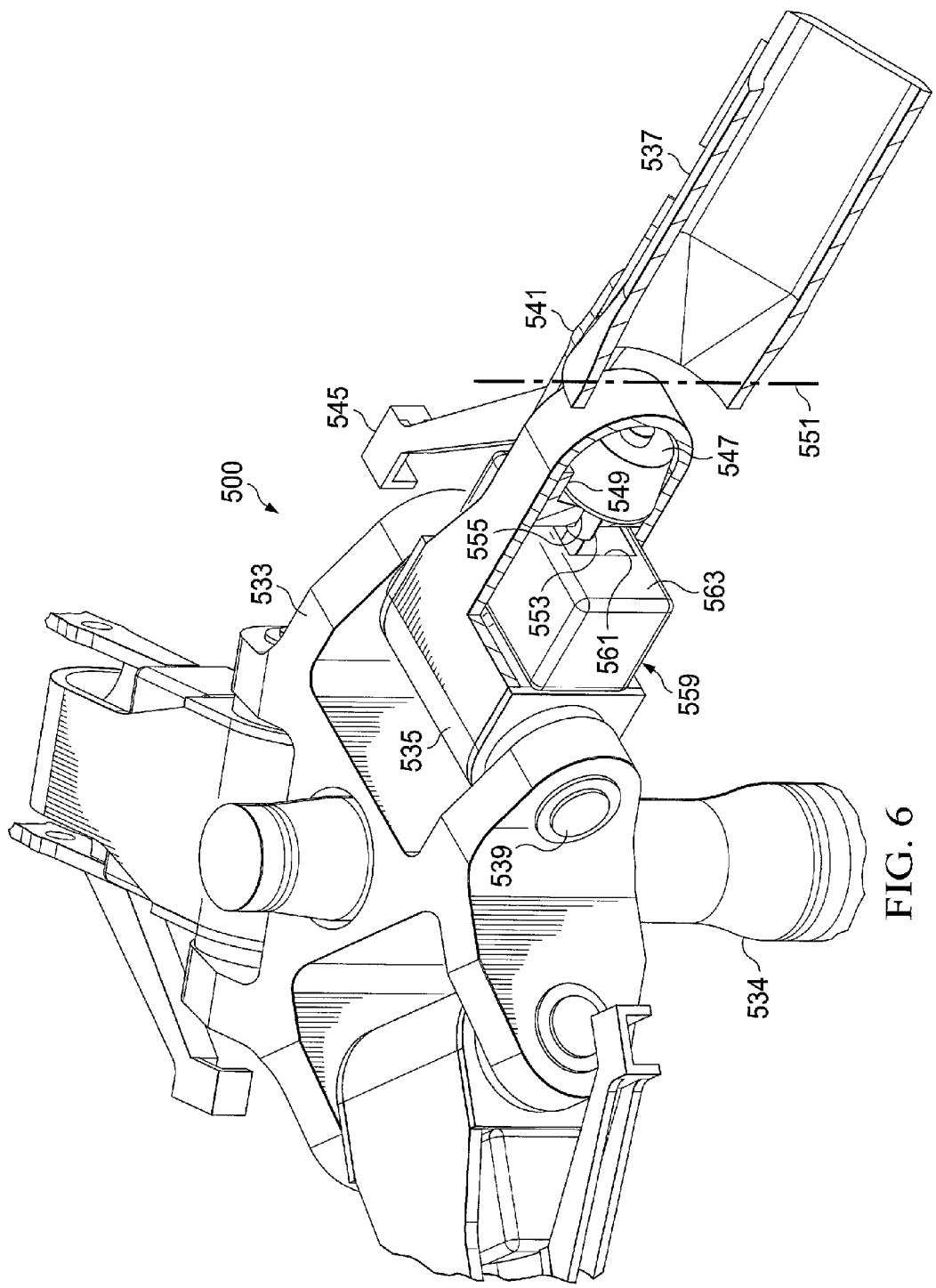
FIG. 6 is a partial cutaway view of the rotor hub of FIG. 5.
Figure 7:
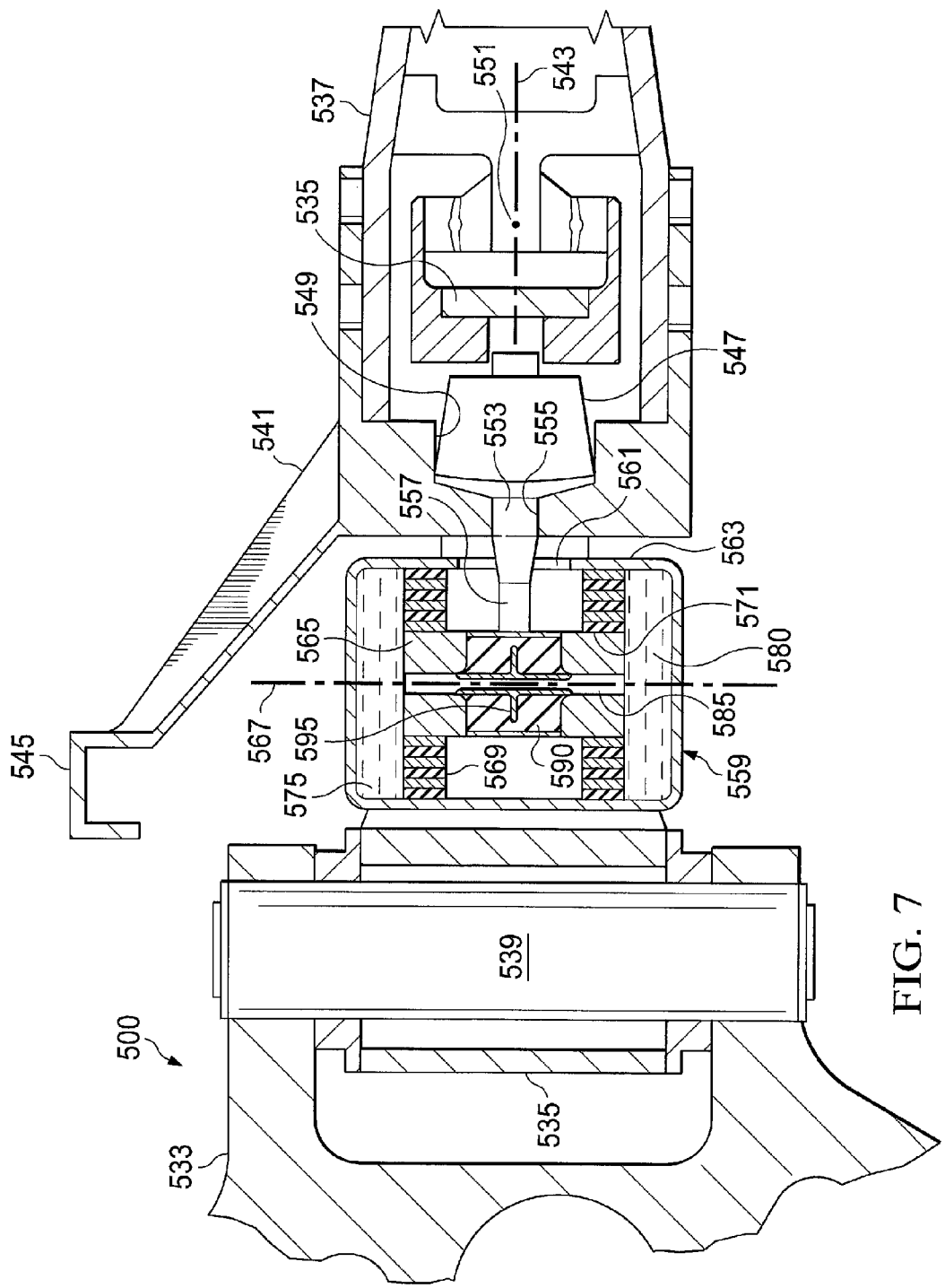
FIG. 7 is a partial cross-sectional plan view of the rotor hub of FIG. 5.

FIGS. 5 through 7 show a simplified, three-blade alternative embodiment of a rotor hub according to this specification. FIG. 5 is an exploded view, FIG. 6 is a partial cutaway of the assembly, and FIG. 7 is a cross-sectional plan view of the assembly. Referring to these figures, hub 500 includes central member 533, blade straps 535, and blade grips 537. Central member 533 is adapted to fixedly receive mast 534. Straps 535 are circumferential and are hingedly connected to central member 533 at flapping hinge 539. This allows for out-of-plane flapping motion of blades (not shown) attached to blade grips 537. Each blade grip 537 receives the root end of a blade in the outer end of grip 537, and the inner end of each grip 537 is connected to the outer end of the associated strap 535 with pitch horn brackets 541. Each grip 537 can rotate about an associated pitch axis 543, and the pitch for the blades is controlled using pitch horns 545 on brackets 541. An elastomeric bearing 547 is received within a recess 549 of each bracket 541 to provide for in-plane, chordwise pivoting of brackets 541 and grips 537 about a lead/lag axis 551 passing through the focus of each bearing 547. Both elastomeric bearing 547 and flapping hinge 539 are located within strap 535, with the axes for these hinges being non-coincident. This configuration may allow for better packaging of the components of hub 500, especially in tilt-rotor applications.

As hub 500 is rotated by mast 534, centrifugal loads from the blades are transferred through grips 537 into brackets 541 and from brackets 541 into bearings 547. The loads are then transferred into straps 535 from bearings 547 and into central member 533 from straps 535. A post 553 protrudes from the inner end of each bearing 547, with post 553 extending through a bore 555 in recess 549 of the corresponding bracket 541. The inner end 557 of post 553 engages damper 559, post 553 extending into an opening 561 in the outer wall 563 of damper 559 and engaging piston 565. Though shown with an elastomeric bearing 547, hub 500 may be constructed in any appropriate configuration, including with pins or similar connections for the lead/lag hinge.

In-plane motion of a blade about the associated lead/lag axis 551 causes a proportional in-plane motion of post 553. Because post 553 is located inward of axis 551, the in-plane motion of post 553 is in the direction opposite the movement of the blade. This motion causes displacement of piston 565 along axis 567, which is resisted by the shearing deflection of elastomeric seals 569 and 571. Displacement of piston 565 also causes deformation in elastomeric seals 569 and 571, which changes the volumes of fluid chambers 575 and 580 and the pressures of the fluid. Consequently, the fluid may flow between chambers 575 and 580 through bore 585, resisting displacement of piston 565 and providing a desired damping force on piston 565.

Retaining element 590 is a temperature-sensitive element that expands with increased temperature and contracts with decreased temperature. Because retaining element 590 is constrained by piston 565 in all but one direction, changes in temperature cause retaining element 590 to deform only in that direction. In the embodiment of fluid damper 559, this deformation is constrained substantially perpendicular to the fluid path provided by bore 585. As retaining element 590 expands and contracts, valve element 595 is also displaced accordingly, adjacent to piston 565, thereby varying the cross-sectional area of the fluid path provided by bore 585. Consequently, as temperature decreases, the effective diameter of bore 585 is expanded, allowing more fluid to flow between chambers 575 and 580. Likewise, as temperature increases, the effective diameter of bore 585 is contracted, restricting fluid flow between chambers 575 and 580.

The system and apparatus described herein provides significant advantages, including (1) providing a damping system that passively adapts to temperature changes without any additional failure modes, and (2) providing a small, lightweight temperature-adaptive damper for use in rotor hubs.

Certain example embodiments have been shown in the drawings and described above, but variations in these embodiments will be apparent to those skilled in the art. The principles disclosed herein are readily applicable to a variety of mechanical systems, including many types of rotary wing, tilt-rotor, and fixed wing aircraft. The preceding description is for illustration purposes only, and the claims below should not be construed as limited to the specific embodiments shown and described.

The invention claimed is:

1. A thermally adaptive damper, comprising:
   a first fluid chamber;
   a second fluid chamber;
   a piston in fluid communication with the first fluid chamber and the second fluid chamber;
   a first elastomeric seal in fluid communication with the first fluid chamber and sealingly attached to an outer surface of a first end of the piston;
   a second elastomeric seal in fluid communication with the second fluid chamber and sealingly attached to an outer surface of a second end of the piston;
   a fluid path extending through the piston from the first fluid chamber and the second fluid chamber;
   an elastomeric retaining element adjacent to the fluid path, constrained to deform substantially perpendicular to the fluid path, so that the retaining element is operable to vary the cross-sectional area of the fluid path inversely to a change in temperature;
   a non-elastomeric valve element embedded within the elastomeric retaining element, so that the valve element is operable to vary the cross-sectional area of the fluid path inversely to a change in temperature.

2. The damper according to claim 1, wherein:
   the elastomeric retaining element is constrained by a wall between the first fluid chamber and the second fluid chamber;
   the wall includes a bore adapted to receive the piston; and
   the fluid path comprises an orifice between the valve element and the piston.

3. The damper according to claim 1, wherein:
   the fluid path comprises a bore through the piston; and
   the elastomeric retaining element is embedded in the piston.

4. The damper according to claim 1, wherein the first and second elastomeric seals are high-capacity laminate seals.

5. The damper according to claim 1, wherein the valve element is segmented such that at least one additional fluid path is provided between the first fluid chamber and the second fluid chamber.

6. A thermally adaptive damper, comprising:
   a first elastomeric seal and a second elastomeric seal sealingly attached to an inner surface of a housing and sealingly attached to an outer surface of a piston, whereby a first fluid chamber is formed between the housing, the first elastomeric seal, and a first end of the piston, and a second fluid chamber is formed between the housing, the second elastomeric seal, and a second end of the piston;
   a fluid path through the piston between the first fluid chamber and the second fluid chamber;
   a elastomeric retaining element embedded in the piston and constrained by an inner surface of the piston to deform substantially perpendicular to the fluid path; and
   a valve element embedded in the retaining element so that the valve element is operable to vary the cross-sectional area of the fluid path inversely to a change in temperature.

7. The damper according to claim 6, wherein the first and second elastomeric seals are high-capacity laminate seals.

8. The damper according to claim 6, wherein the valve element is segmented such that at least one additional fluid path is provided between the first fluid chamber and the second fluid chamber.

9. An aircraft, comprising:
a mast operably connected to a drive unit;
a central member fixed to the mast,
a blade strap hingedly connected to the central member;
a thermally adaptive fluid damper secured within the blade strap;
a blade grip secured to the blade strap; and
an elastomeric bearing secured in the blade strap operably engaged to the blade grip and to the thermally adaptive fluid damper;
wherein the thermally adaptive fluid damper comprises:
   a first fluid chamber;
   a second fluid chamber;
   a piston in fluid communication with the first fluid chamber and the second fluid chamber;
   a first elastomeric seal in fluid communication with the first fluid chamber and sealingly attached to an outer surface of a first end of the piston;
   a second elastomeric seal in fluid communication with the second fluid chamber and sealingly attached to an outer surface of a second end of the piston;
   a fluid path extending through the piston from the first fluid chamber and the second fluid chamber; and
   an elastomeric retaining element adjacent to the fluid path, constrained to deform substantially perpendicular to the fluid path, so that the retaining element is operable to vary the cross-sectional area of the fluid path inversely to a change in temperature.

10. The aircraft according to claim 9, wherein the damper further comprises a valve element embedded within the elastomeric retaining element, so that the valve element is operable to vary the cross-sectional area of the fluid path inversely to a change in temperature.

11. The aircraft according to claim 9, wherein:
the fluid path comprises a bore through the piston; and
the elastomeric retaining element is embedded in the piston.

12. The aircraft according to claim 9, wherein the first and second elastomeric seals are high-capacity laminate seals.

13. The aircraft according to claim 10, wherein the valve element is segmented such that at least one additional fluid path is provided between the first fluid chamber and the second fluid chamber.

* * * * *